US012723414B2

(12) United States Patent
Wild

(10) Patent No.: US 12,723,414 B2
(45) Date of Patent: Sep. 1, 2026

(54) ADJUSTABLE NOTCHED TROWEL

(71) Applicant: Stefan Wild, Winter Garden, FL (US)

(72) Inventor: Stefan Wild, Winter Garden, FL (US)

( * ) Notice: Subject to any disclaimer, the term of this patent is extended or adjusted under 35 U.S.C. 154(b) by 0 days.

(21) Appl. No.: 19/361,930

(22) Filed: Oct. 17, 2025

(65) Prior Publication Data

US 2026/0043255 A1 Feb. 12, 2026

Related U.S. Application Data

(63) Continuation of application No. 18/350,736, filed on Jul. 11, 2023, now abandoned.

(51) Int. Cl.
*E04F 21/08* (2006.01)
*E04F 21/16* (2006.01)
*B05C 17/10* (2006.01)

(52) U.S. Cl.
CPC ............ *E04F 21/162* (2013.01); *B05C 17/10* (2013.01); *E04F 21/08* (2013.01)

(58) Field of Classification Search
CPC ......... E04F 21/162; E04F 21/08; B05C 17/10
See application file for complete search history.

(56) References Cited

U.S. PATENT DOCUMENTS 3,166,776 A 1/1965 Sclck
3,460,183 A * 8/1969 Harrington ............. E04F 21/06 403/384
3,803,662 A * 4/1974 Glejf ..................... E04F 21/241 15/245.1
4,804,321 A * 2/1989 Riesgo .................. E04F 21/241 401/5
4,817,231 A * 4/1989 Ocwieja .................. E04F 21/06 15/235.4
4,946,360 A * 8/1990 Brown .................... B05C 17/10 15/245.1
4,958,399 A * 9/1990 Toal ....................... E04F 21/162 15/245.1
5,193,244 A * 3/1993 Meyers ................. E04F 21/163 15/245.1
5,231,729 A * 8/1993 Rose ..................... E04F 21/162 15/235.4
5,467,496 A * 11/1995 Jarvis ....................... B25G 3/08 404/97
6,767,151 B1 * 7/2004 Owens ................... B65D 75/32 401/262
10,799,907 B1 * 10/2020 Daranuta ............. E04F 21/162
(Continued)

*Primary Examiner* — Michael D Jennings
(74) *Attorney, Agent, or Firm* — Jason T. Daniel, Esq.; Daniel Law Offices, P.A.

(57) ABSTRACT

A trowel device includes a bottom plate that is connected to a top plate by a plurality of connectors. The bottom plate includes a generally rectangular-shaped member having a pair of threaded vertical posts, a first plurality of protrusions and notches along a first side, and a second plurality of protrusions and notches along the second side. The top plate includes a handle and a pair of elongated slots for receiving the pair of threaded posts. The bottom plate is secured beneath the top plate by connectors and slides sideways to selectively extend and retract the protrusions and notches from either side of the top plate. A plurality of measurement markers are provided for allowing a user to select exact amounts at which the protrusions and notches are extended outward from either side of the top plate.

14 Claims, 6 Drawing Sheets

(56) References Cited

U.S. PATENT DOCUMENTS

| | | | | |
|---|---|---|---|---|
| 2005/0053723 | A1* | 3/2005 | Brzoska | E04F 21/06 427/256 |
| 2009/0217476 | A1* | 9/2009 | Hurley | E04F 21/163 15/235.8 |

* cited by examiner

ADJUSTABLE NOTCHED TROWEL

CROSS-REFERENCE TO RELATED APPLICATIONS

This application is a continuation-in-part to and claims the benefit of U.S. Application Ser. No. 18/350,736 filed on Jul. 11, 2023, the contents of which are incorporated herein by reference.

TECHNICAL FIELD

The present invention relates generally to the field of construction hand tools. More specifically, the present invention relates to a notched trowels that are used to apply a bonding material to a surface substrate.

BACKGROUND

In the construction industry, a substrate refers to the surface upon which building materials are installed. During its installation, the substrate is covered with a bonding material, and the building material is pressed against the bonding material to form a bond. By way of example, building materials such as tile may be affixed to substrates surfaces such as floors, countertops, walls, tables, and other surfaces by means of a bonding material such as cement, mortar, epoxy, resin, or some other bonding adhesive.

The traditional application of the bonding material to the substrate is performed by applying the bonding material to a hand tool and then using that hand tool to spread the bonding material to the substrate evenly. In order to create a successful bond where the building material has up to 100 percent contact with the bonding material, a specific application process must be used which utilizes a notched trowel. Following the application of the bonding material to the trowel, the trowel is used to spread the bonding material across the substrate surface. The notched edge of the trowel is then used to make perpendicular or angular decreases in the bonding material surface to allow for maximum contact between the base of the building material and the surface of the bonding material. The perpendicular or angular decreases in the bonding material allow for the bonding material to adhere to any present uneven areas of the building material and minimize the risk of trapping air between the building material and the substate surface.

Notched trowels that are currently used in the industry typically comprise of a top plate having notched edges, and a handle that is connected to the upper surface of the top plate. For those who are applying a bonding material in such a way that requires the need to be of different notch sizes, different trowels must be used. In addition, those who are left-handed may have challenges with utilizing traditional notched trowel due to the location of the handle.

The present invention, directed to an adjustable notched trowel differs from the conventional art in a number of aspects. The manner by which will become more apparent in the description which follows, particularly when read in conjunction with the accompanying drawings.

SUMMARY OF THE INVENTION

The present invention is directed to a trowel device. One embodiment of the present invention can include a bottom plate that is connected to a top plate by a plurality of connectors. In one embodiment, the bottom plate can include a generally rectangular-shaped member having a first plurality of protrusions and notches along a first side, and a second plurality of protrusions and notches along the second side. The bottom plate can further include a pair of threaded posts that extend upward from the top surface.

In one embodiment, the top plate can include a handle and a pair of elongated slots for receiving the pair of threaded posts. The bottom plate can be secured beneath the top plate by connectors that engage the threaded posts. The bottom plate can slide side-to-side relative to the top plate to selectively extend and retract the first and second plurality of protrusions and notches from the sides of the top plate.

In one embodiment, a plurality of measurement markers can be provided for allowing a user to select exact amounts at which the protrusions and notches can extend, and the bottom plate can be connected in two orientations so as to allow the first and second plurality of protrusions and notches to extend outward from either side of the top plate.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
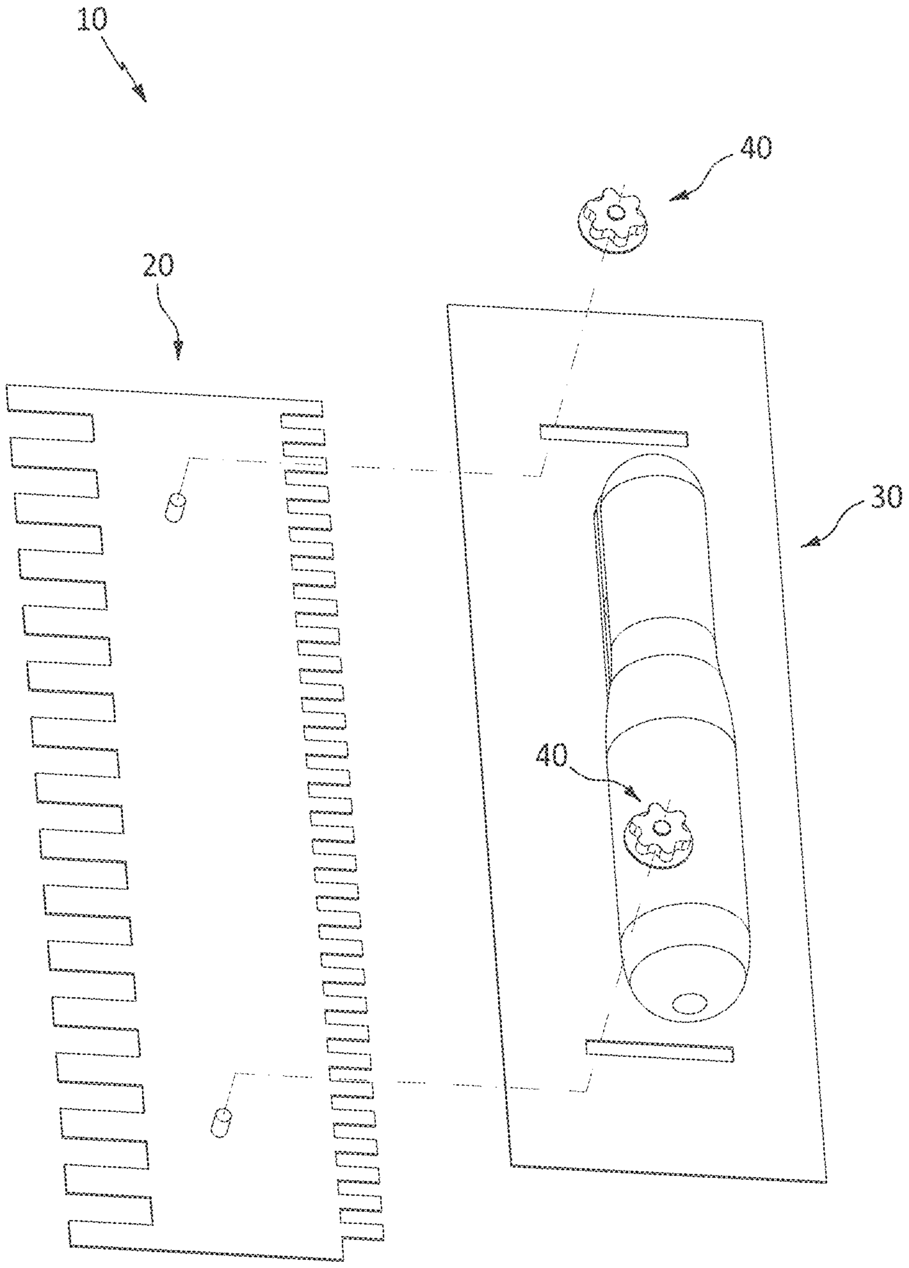
FIG. 1 is an exploded parts view of an adjustable notched trowel device in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape, or measurement of a component within a tolerance such as, for example, manufacturing tolerances, measurement tolerances, or the like.

As described herein, the term "slidingly engage", "slidingly connected" and derivatives thereof shall be used interchangeably to describe a situation wherein two identified objects are connected such that one identified part moves linearly beneath, above, toward and/or away from the other identified part so as to selectively lengthen or shorten the total width of the overall device.

As described throughout this document, the term "removably secured" and derivatives thereof shall be used to describe a situation wherein two or more objects are joined together in a non-permanent manner so as to allow the same objects to be repeatedly joined and separated. This can be accomplished through the use of any number of different "connectors." Several nonlimiting examples of connectors include, but are not limited to, flexible straps with a series of serrations along their lengths and pawls or ratchets along one of the ends (i.e., zip ties), thread-to-connect, twist-to-connect, and push-to-connect type devices, opposing strips of hook and loop material (e.g., Velcro®), attractively-oriented magnetic elements or magnetic and metallic elements, clamps, sockets, clips and compression fittings, for example.

Each illustrated connector can be permanently secured to the illustrated portion of the device via a permanent sealer such as glue, adhesive tape, or stitching, for example.

Moreover, the term "permanently secured" shall be used to describe a situation wherein two or more objects are joined together in a manner so as to prevent the same objects from being separated. Several nonlimiting examples of permanent connectors include various adhesives such as glue or resin, hardware such as nuts and bolts, and welds, for example.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

FIGS. 1-6 illustrate one embodiment of an adjustable notched trowel device 10 that is useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

FIG. 1 is an exploded parts view of one embodiment of an adjustable notched trowel device 10 that includes a bottom plate 20 that is slidingly secured onto a top plate 30 via connectors 40.

Figure 2:
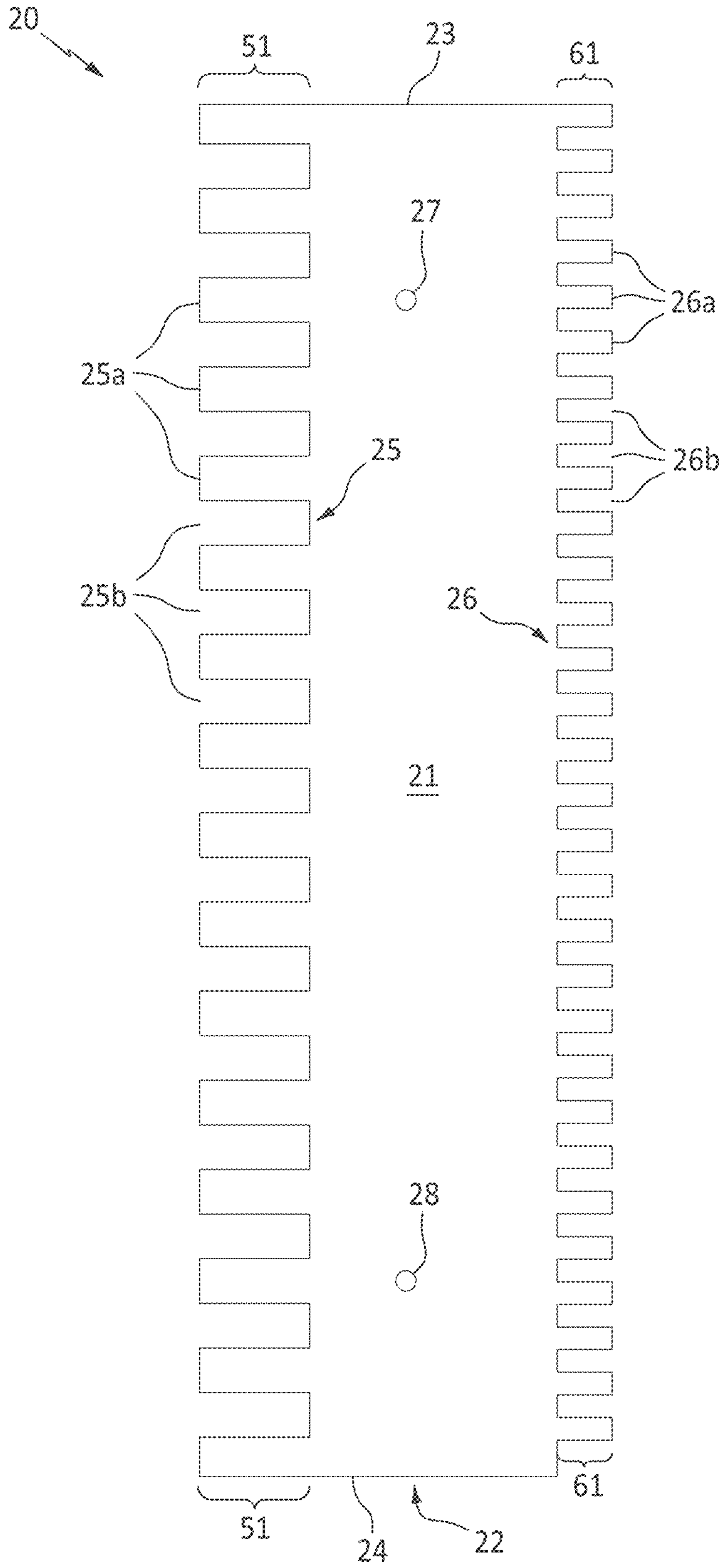
FIG. 2 is a top view of the bottom plate of the adjustable notched trowel device in accordance with one embodiment of the invention.

As shown best at FIG. 2, one embodiment of the bottom plate 20 can include an elongated generally rectangular-shaped member having a top surface 21, a bottom surface 22, a front end 23, a back end 24, a first side 25, and a second side 26. In one embodiment, the entire bottom plate 20 can be constructed from a thin (e.g., 1 mm-3 mm) piece of metal, such as stainless steel or aluminum, for example, so as to be suitable for use with any number of different types of bonding agents.

In one embodiment, a first series of protrusions and notches can be provided along the first side 25 of the bottom plate, and a second series of protrusions and notches can be provided along the second side 26 of the bottom plate 20. Although it is contemplated that the notches and protrusions on both sides of the bottom plate may be identical, in the preferred embodiment, the first plurality of notches and protrusions will include shapes and/or dimensions that are different from the second plurality of notches. Such a feature is preferred so as to allow a single device 10 to be used to install tiles and other materials of varying sizes.

For example, in the preferred embodiment, each of the protrusions **25*a* and notches 25*b* along the first side 25 can include a length (e.g., direction extending between surfaces 23 and 24) of about 1 cm, and a width (e.g., direction extending between surfaces 25 and 26) of about 3 cm. Such dimensions being specifically provided for allowing the device 10** to be used to install large tiles such as 12-16 inches, for example.

Likewise, in one embodiment each of the protrusions **26*a* and notches 26*b* along the second side 26 can include a length of about 0.5 cm, and a width of about 2 cm. Such dimensions being specifically provided for allowing the device 10** to be used to install small tiles such as 4-10 inches, for example. Of course, any number of other dimensions are also contemplated.

In one embodiment, two threaded posts 27 and 28 can extend perpendicularly upward from the top surface 21 of the bottom plate 20 for allowing the bottom plate to be slidingly connected to the top plate 30.

In one embodiment, measurement marks 51 and 61 can be provided along the protrusions **25*a* and 26*a***, respectively. In the preferred embodiment, each of these measurement marks can extend from the base of the protrusions outward to the distal end of the respective protrusions and can function in aiding a user to selectively extend and retract the bottom plate specific distances relative to the top plate.

Although described above with regard to a particular shape, size and construction material, other embodiments are contemplated. To this end, the bottom plate including the protrusions and notches can each include any number of different shapes and sizes and may be constructed from any number of different materials that are, for example, relatively strong and stiff for their weight. Several nonlimiting examples include, but are not limited to various metals or metal alloys (e.g., aluminum, steel, titanium, or alloys thereof), and/or various plastics and polymers (e.g., high-density polyethylene (HDPE), rigid polyvinyl chloride (PVC)) among other materials suitable for being in prolonged contact with bonding agents such as adhesives, for example.

Figure 3:
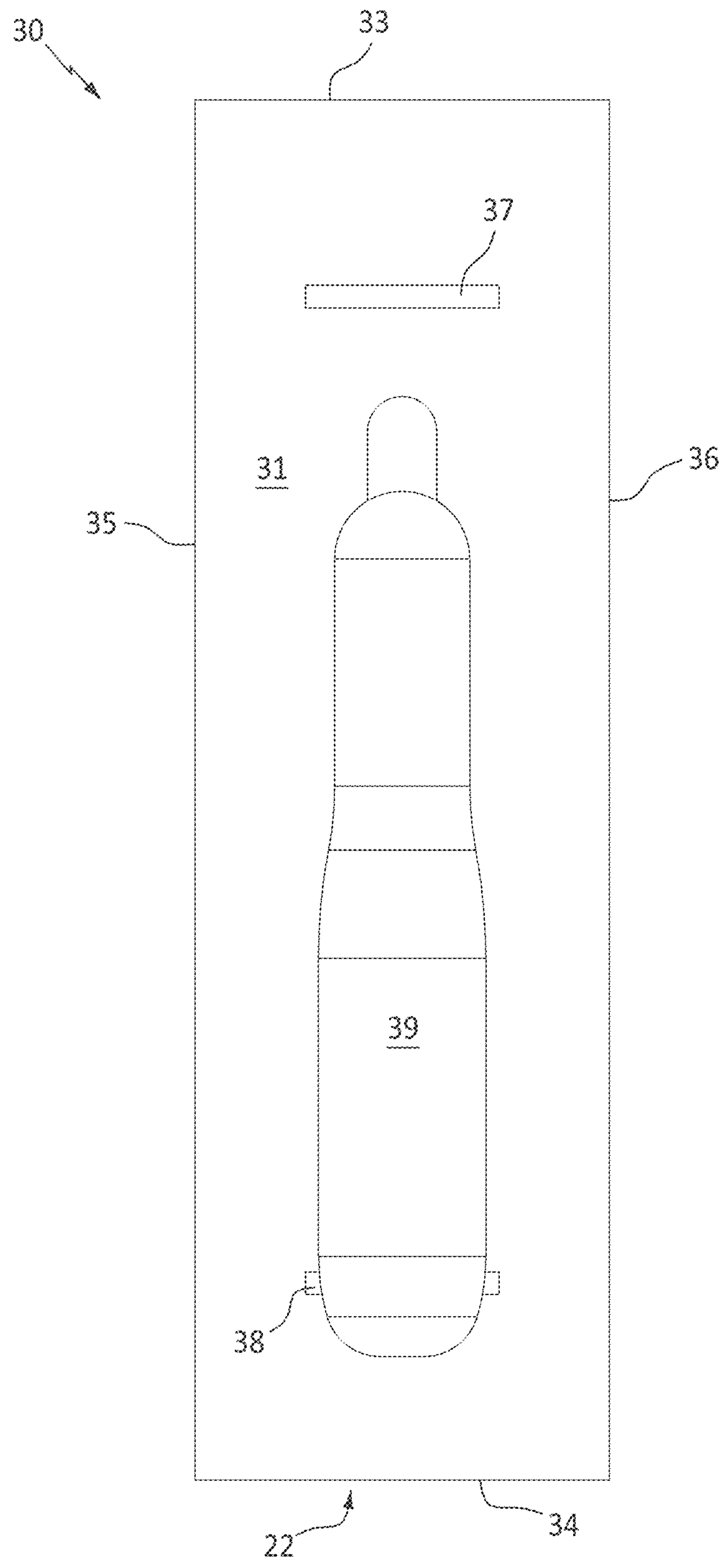
FIG. 3 is a top view of the top plate of the adjustable notched trowel device in accordance with one embodiment of the invention.

FIG. 3 illustrates one embodiment of the top plate 30. As shown, the top plate can include an elongated generally rectangular-shaped member having a top surface 31, a bottom surface 32, a front end 33, a back end 34, a first side 35, and a second side 36. In one embodiment, a pair of elongated slots 37 and 38 can be disposed along the plate 30 at locations complementary to the locations of the posts 27 and 28, respectively, and a handle 39 can extend upward from the top surface 31.

In the preferred embodiment, the top plate 30 will be constructed from an identical material as the bottom plate 20 and will include a size that is complementary to the size of the bottom plate. Moreover, the handle 39 can include any number of different shapes and sizes suitable for allowing a human hand to grasp and control the movement of the device 10.

Although described above with regard to a particular shape, size and construction material, other embodiments are contemplated. To this end, the top plate can include any number of different shapes and sizes and may be constructed from any number of different materials.

Figure 4:
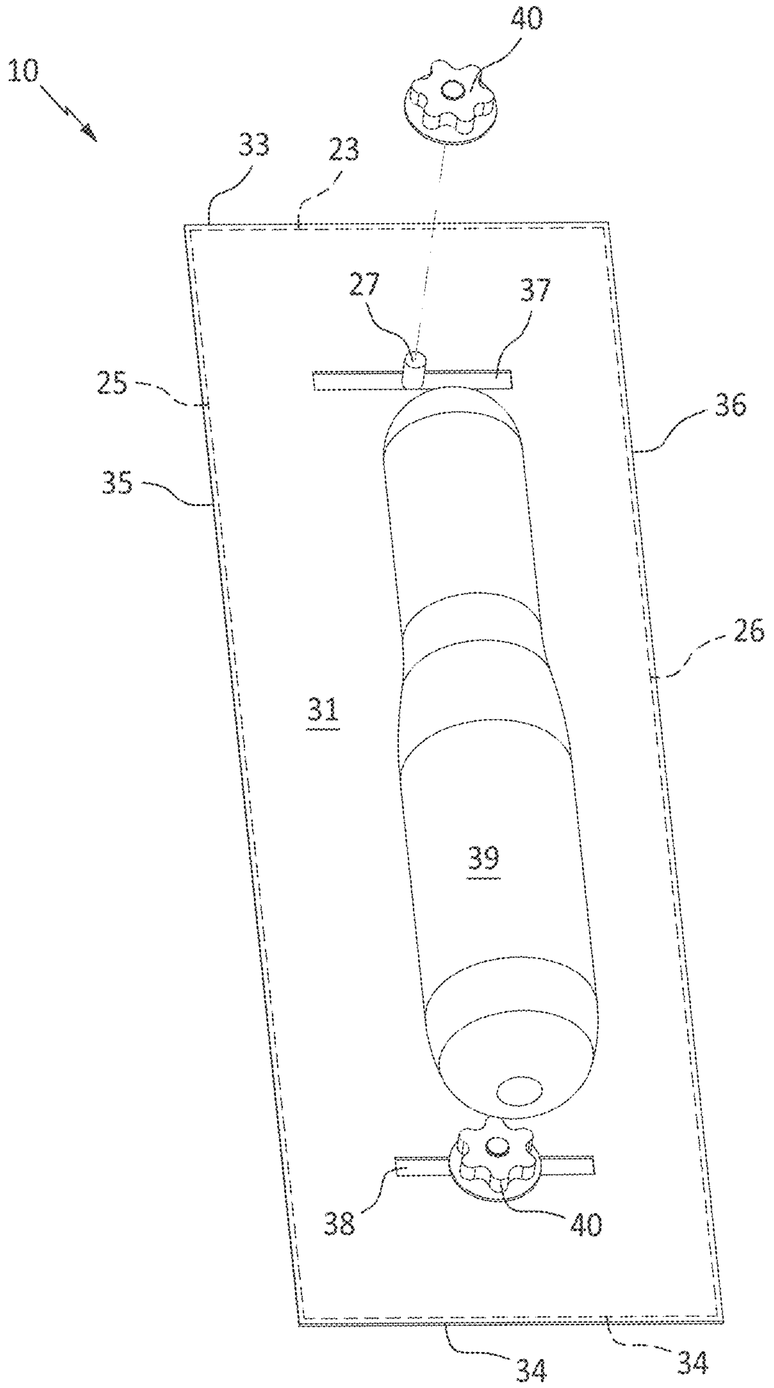
FIG. 4 is a top view of the adjustable notched trowel device in a first position, in accordance with one embodiment of the invention.

As shown at FIG. 4, the device 10 can be assembled by first positioning the posts 27 and 28 through the slots 37 and 38 and then securing the plates together via connectors 40 such as the illustrated threaded knobs, for example. When so positioned, the top surface of the bottom plate will be slidingly positioned against the bottom surface of the top plate.

In the preferred embodiment, the top plate can include dimensions that are complementary to the dimensions of the bottom plate such that when the plates are vertically aligned and the posts 27/28 are centrally positioned within the slots 37/38, respectively, the bottom plate will be positioned wholly beneath the top plate.

When so positioned, the sides 35 and 36 of the top plate 30 can be used to apply bonding agents onto a substrate. Moreover, when the sides 35 and 36 are straight and do not include protrusions or notches, device 10 can be utilized as a finishing trowel wherein the absence of notches are used to apply and level bonding agents and other such materials. Of course, other embodiments are contemplated wherein the sides 35 and 36 include non-straight edges having notches, protrusions, and/or curvilinear features for allowing the sides to be used for different purposes.

Figure 5:
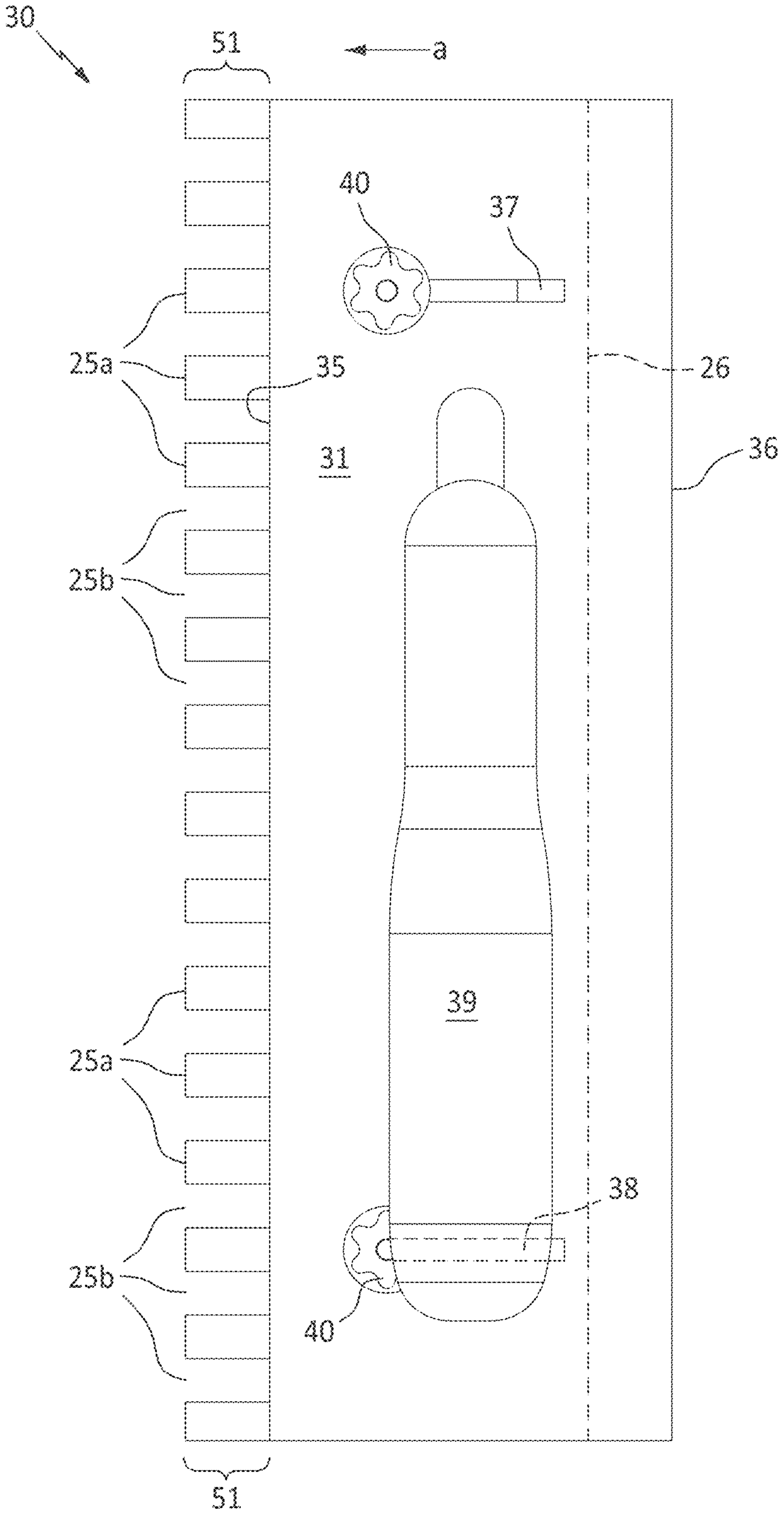
FIG. 5 is a top view of the adjustable notched trowel device in a second position, in accordance with one embodiment of the invention.
Figure 6:
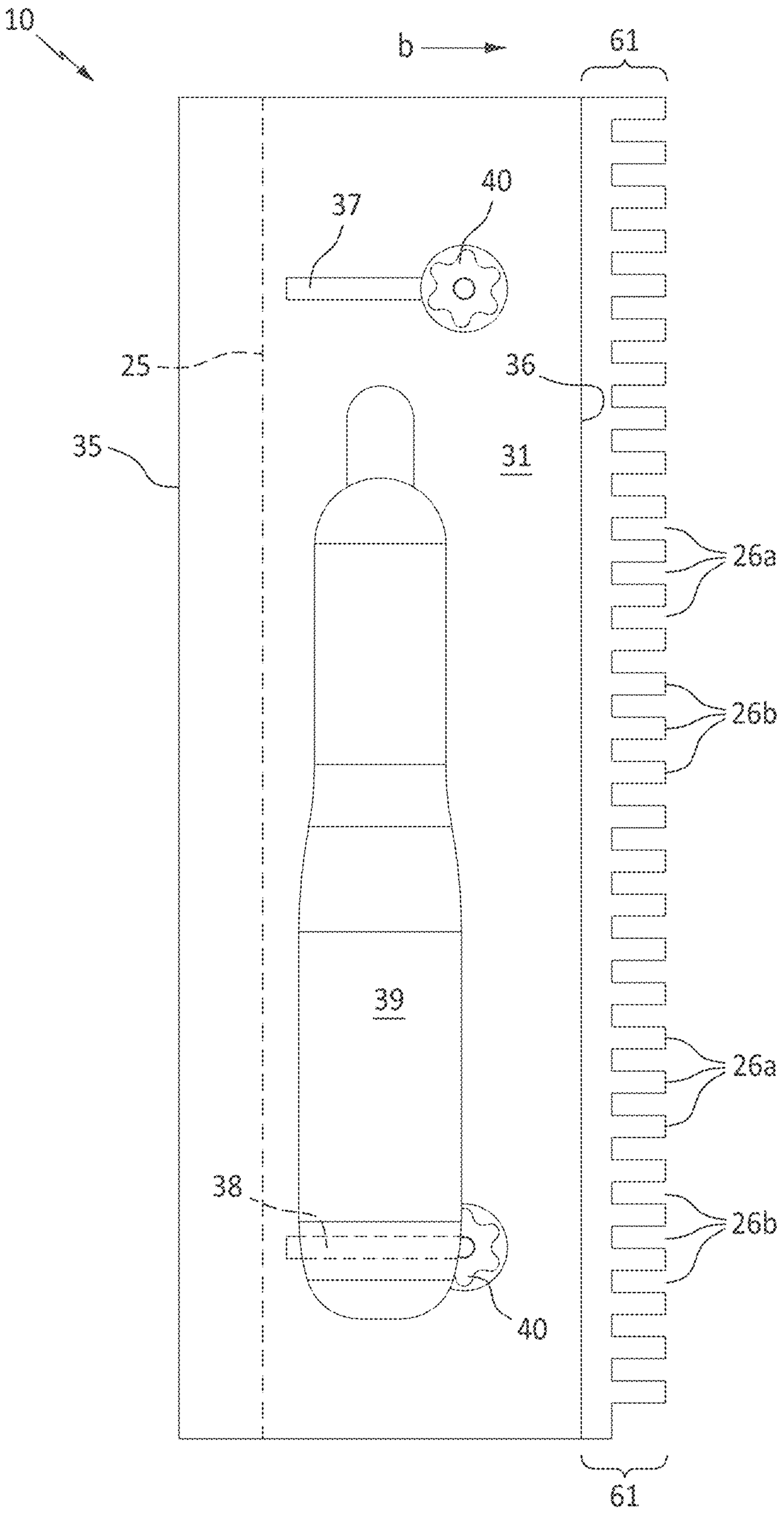
FIG. 6 is a top view of the adjustable notched trowel device in a third position, in accordance with one embodiment of the invention.

As shown at FIGS. 5 and 6, the bottom plate 20 can be slid (arrows a and b) side to side beneath the top plate 30 in order to selectively extend the first plurality of protrusions **25*a* and notches 25*b* outward from the first side 35 of the top plate 30, and the second plurality of protrusions 26*a* and notches 26*b* outward from the second side 36** of the top plate.

When so positioned, the measurement marks 51 and 61 allow a user to select any desired amount at which the protrusions extend outward from the main body before tightening the connectors 40 to lock the device in the set position.

Accordingly, the notched trowel device 10 can operate in at least three distinct modes for use as a large tile trowel (e.g., FIG. 5) a small tile trowel (e.g., FIG. 6) and as a finishing trowel (e.g., FIG. 4). Additionally, the device beneficially allows the user to customize the extension amounts of the protrusions to suit a variety of different bonding agents and to create ridged patterns in the agents in both shallow and deep amounts.

Moreover, because the posts 27 and 28 are positioned equidistant from the ends of the bottom plate, the device 10 can be assembled such that protrusions and notches **25*a*/25*b* and 26*a*/26*b* extend outward from sides 36 and 35, respectively. Such a feature allowing the device 10** to be operated as both a left-handed trowel and a right-handed trowel with the desired protrusions and notches extending outward on either side of the top plate.

Although illustrated above with regard to straight edges on the top plate 30, other embodiments are contemplated wherein the top plate can also include curvilinear side sections. Likewise, although described with regard to specifically shaped protrusions and groves on the bottom plate 20, this is for illustrative purposes only. To this end, those of skill in the art will recognize that the bottom plate 20 can be manufactured to include any number of different shapes and sizes, and a plurality of different shaped and sized bottom plates can be used with a single top plate to create a system for use with any number of different bonding agents and other such uses. Accordingly, the inventive concepts are not to be construed as limiting to the illustrated shapes and sizes.

As to a further description of the manner and use of the present invention, the same should be apparent from the above description. Accordingly, no further discussion relating to the manner of usage and operation will be provided.

As described herein, one or more elements of the above noted device and system can be secured together utilizing any number of known attachment means such as, for example, screws, glue, compression fittings, and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting" shall be used to describe only those components identified. In each instance where a device comprises certain elements, it will inherently consist of each of those identified elements as well.

Any element in a claim that does not explicitly state "means" for performing a specified function or "step" for performing a specified function should not be interpreted as a "means" or "step" clause as specified in 35 U.S. C. 112. The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A trowel device, comprising:

a bottom plate having a top surface, a bottom surface, a first side surface and a second side surface;

a first plurality of protrusions that extend outward from the first side surface of the bottom plate;

a second plurality of protrusions that extend outward from the second side surface of the bottom plate;

a top plate having a top surface, a bottom surface, a first side surface and a second side surface; and a handle that is positioned along the top plate, wherein the bottom plate is removably connected to the top plate, wherein the first side surface of the top plate and the second side surface of the top plate are planar, wherein the first side surface with the first plurality of protrusions on the bottom plate is positioned parallel to the second side surface with the second plurality of protrusions on the bottom plate, and wherein the bottom plate is slidingly connected to the top plate and is configured to be positioned in each of a first position, a second position and a third position.

2. The device of claim 1, wherein the bottom plate is configured to be positioned beneath the top plate.

3. The device of claim 2, wherein the bottom plate is configured to move relative to the top plate.

4. The device of claim 1, further comprising:

a first plurality of notches that are positioned between the first plurality of protrusions on the first side surface of the bottom plate.

5. The device of claim 1, further comprising:

a second plurality of notches that are positioned between the second plurality of protrusions on the second side surface of the bottom plate.

6. The device of claim 1, wherein the bottom plate is constructed from metal.

7. The device of claim 1, wherein the top plate is constructed from metal.

8. The system of claim 1, wherein the bottom plate is configured to slide perpendicularly relative to the top plate.

9. The system of claim 1, wherein in the first position, the first plurality of protrusions extend outward from the first side surface of the top plate and the second plurality of protrusions are positioned completely behind the top plate.

10. The system of claim 1, wherein in the second position, the second plurality of protrusions extend outward from the second side surface of the top plate and the first plurality of protrusions are positioned completely behind the top plate.

11. The system of claim 1, wherein in the third position, each of the first plurality of protrusions and the second plurality of protrusions are positioned completely behind the top plate.

12. The system of claim 1, wherein the first plurality of protrusions include an identical shape and size as a shape and a size of the second plurality of protrusions.

13. The system of claim 1, wherein the first plurality of protrusions include a different shape and size as a shape and a size of the second plurality of protrusions.

14. The system of claim 1, further comprising:

a plurality of measurement marks that are positioned along at least one of the first side surface of the bottom plate or the second side surface of the bottom plate.

* * * * *